Figure 1:
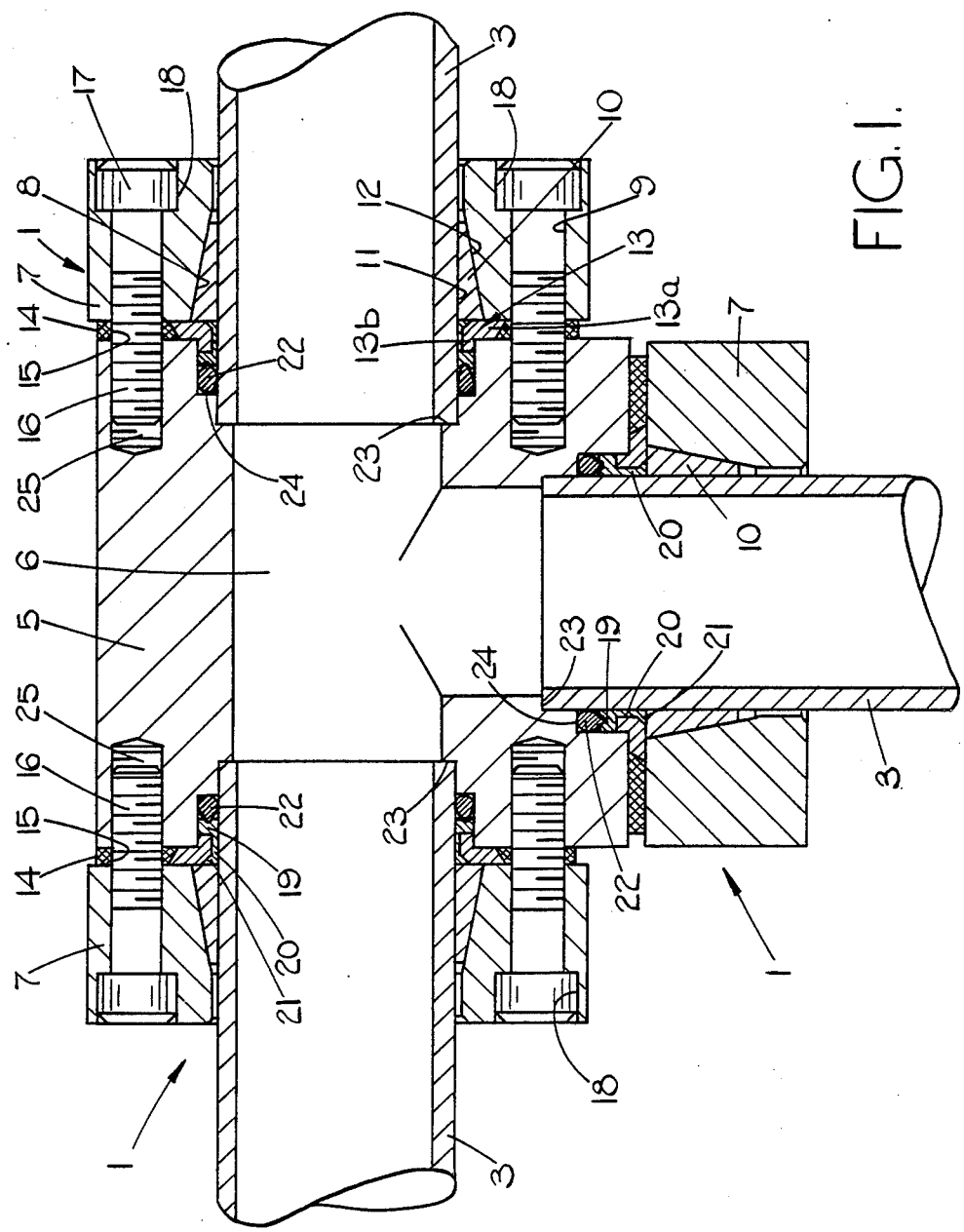

United States Patent [19]

Kelly et al.

[11] Patent Number: 4,457,541
[45] Date of Patent: Jul. 3, 1984

[54] PIPE COUPLING

[75] Inventors: John J. Kelly, Finham; Jeremy R. Hughes; Wellesbourne, both of England

[73] Assignee: Lucas Industries Limited, Birmingham, England

[21] Appl. No.: 309,439

[22] Filed: Oct. 7, 1981

[30] Foreign Application Priority Data

Oct. 16, 1980 [GB] United Kingdom ............... 8033460

[51] Int. Cl.³ ..................... F16L 55/00; F16L 21/06
[52] U.S. Cl. .................................... 285/23; 285/323; 285/342; 285/343
[58] Field of Search ................. 285/23, 323, 342, 343

[56] References Cited

U.S. PATENT DOCUMENTS 4,006,921 2/1977 Mohr ............................ 285/323 X
4,138,147 2/1979 Manchester et al. ........... 285/323 X
4,239,266 12/1980 Mynhier .......................... 285/323

Primary Examiner—Richard J. Scanlan, Jr.
Attorney, Agent, or Firm—Staas & Halsey

[57] ABSTRACT

The pipe coupling has an annular flange member having a tapered inner surface portion and a plurality of holes therethrough. Bolts project through the holes. A pipe-engageable collet is mounted in the flange member and has a tapered outer surface portion engaged with the tapered inner surface portion. An annular, retainer element engages a surface of the flange member from which the bolts project and overlaps an outer peripheral portion of the seal back-up member and has a plurality of holes therethrough which are in substantial alignment with the holes through the flange member. The bolts project through the holes in the retainer element whereby the bolts and the retainer element are retained in position by virtue of their mutual interengagement and the seal back-up member and collet are retained in position by virtue of the engagement of the retainer element with the seal back-up member. The coupling can be relatively easily handled and easily manipulated into position even in a confined space without risk of the back-up member, the collet, and/or the bolts becoming inadvertently disengaged.

10 Claims, 2 Drawing Figures

PIPE COUPLING

This invention relates to a pipe coupling and is more particularly concerned with a pipe coupling in which the coupling is made by securing two flanges together using a plurality of bolts, screws or the like (hereinafter simply referred to as "bolts").

It is an object of the present invention to provide a pipe coupling or part thereof in a form in which it can be easily handled and in which risk of incorrectly assembling the coupling is minimised.

According to the present invention, there is provided a pipe coupling comprising an annular flange member having a tapered inner surface portion and a plurality of holes therethrough, bolts projecting through said holes, means for retaining the bolts against disengagement from said holes; a pipe-engageable collet mounted in the flange member and having a tapered outer surface portion engaged with the tapered inner surface portion; an annular, seal back-up member positioned to retain the collet against disengagement from the flange member, and means for retaining the seal back-up member against detachment from the flange member. Such a pipe coupling can be relatively easily handled and easily manipulated into position even in a confined space without risk of the back-up member, the collet, and/or the bolts becoming inadvertently disengaged.

Preferably, both of said retainer means are defined by an annular retainer element which overlaps an outer peripheral portion of the seal back-up member; the retainer element having a plurality of holes therethrough which are in substantial alignment with the holes through the flange member, and the bolts projecting through said holes in the retainer element, whereby the bolts and the retainer element are retained in position by virtue of their mutual interengagement and the seal back-up member and collet are retained in position by virtue of the engagement of the retainer element with the seal back-up member.

The bolts are preferably an interference fit with the holes in the retainer element.

If the pipe coupling is of a type which requires an anti-extrusion washer to be disposed between a seal and the seal back-up member, then the anti-extrusion washer and the seal back-up member are preferably so mutually formed that the anti-extrusion water is engaged with and held by the seal back-up member. In a preferred embodiment this is effected by providing the anti-extrusion washer with a formation which is a snap-fit with the seal back-up member.

Preferably, the collet takes the form of an axially split sleeve which may or may not be internally serrated to bite into the surface of the pipe. The sleeve is preferably provided with a frusto-conically tapered external surface which engages with the inner surface of the flange member which may also be frusto-conically tapered.

Most advantageously, the outer peripheral surface of the seal back-up member is chamfered and the inner peripheral surface of the retainer element is provided with an undercut chamfer whereby the retainer element overlaps the back-up member to retain it in position.

Figure 2:
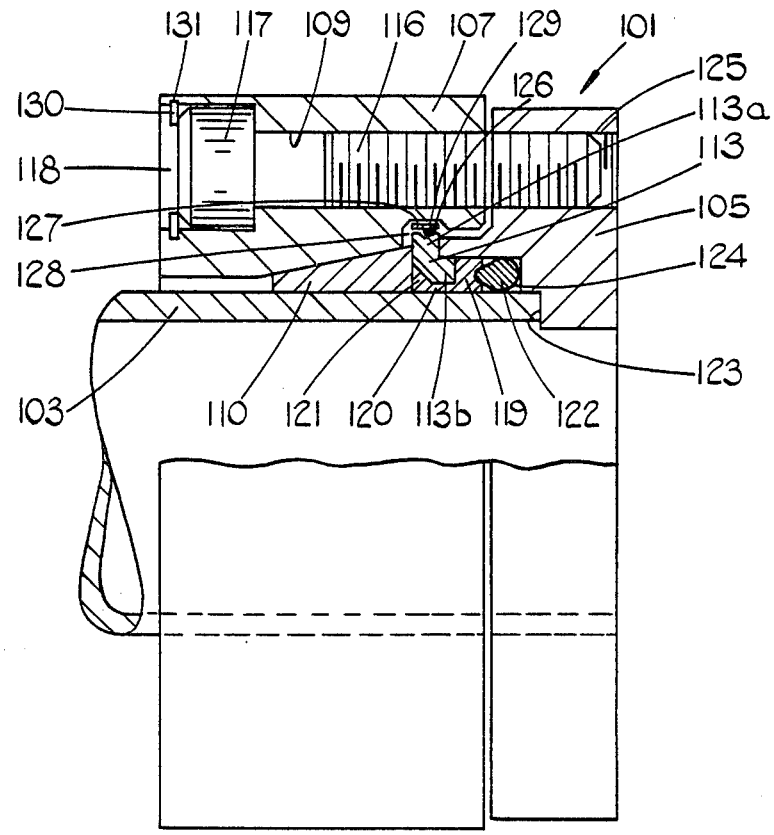

Embodiments of the present invention will now be described, by way of example, with reference to the accompanying drawings in which:

FIG. 1 is an axial section through a T-joint incorporating three identical couplings according to one embodiment of the present invention, and FIG. 2 is a part axial section through part of an in-line pipe joint showing another form of coupling according to the present invention.

Referring to FIG. 1 of the drawings, three couplings according to the present invention are indicated generally by arrows 1, each coupling 1 being used to secure a respective pipe 3 to a T-shaped body 5, whereby the pipes are connected together via a T-shaped passage 6 in the body 5. Each pipe coupling 1 comprises an annular, steel flange member 7 having an inner peripheral surface 8 composed of a frusto-conically tapered portion and a cylindrical portion extending from the frustum of the latter. A plurality (eight in this embodiment) of holes 9 extend through the flanged member 7. The holes 9 extend parallel to the longitudinal axis of the annular member 7. Disposed within the flange member 7 is a collet 10 which is axial split (not shown) and provided with an inner surface 11 which engages against the pipe 3 in use. The outer peripheral surface 12 of the collet 10 is frustoconically tapered at the same angle as the frusto-conically tapered portion of the inner peripheral surface 8 of the flange member 7. The axial length of the collet 10 is less than that of the frusto-conically tapered portion of the surface 8. The coupling 1 further includes an annular seal back-up member 13 which is of L-shaped form in the section shown in the drawing. One arm 13a of the member 13 extends radially outwardly relative to the flange member 7 and abuts against one axial end surface of the latter. The outer periphery of the arm 13A is chamfered at an angle of 45° relative to the axial direction of the coupling. The other arm 13b of the member 13 extends axially of the coupling and has an internal diameter which is greater than that of the pipe 3. As can be seen from the drawing, the back-up member 13 overlaps the collet 10 in the radial direction of the coupling. Thus, when in position, the back-up member 13 prevents the collet 10 from sliding out of engagement with the flange member 7 by axial movement to the left as viewed in the drawing. Because the frusto conical portions of the collet 10 and the flange member 7 taper inwardly away from the back-up member 13, the collet 10 is prevented from becoming disengaged from the flange member 7 by axial movement to the right as viewed in the drawing.

In order to retain the back-up member 13 in position, a flat, annular plastics (eg polypropylene) retainer element 14 is provided. This element 14 has an inner peripheral surface provided with an undercut chamfer thereon which mates with the chamfer on the portion 13a of the member 13. The element 14 is provided with a plurality of holes 15 therethrough which are aligned with, but smaller in diameter than, the holes 9. Projecting through each hole 9 and its associated aligned hole 15 is the screw-threaded shank of a respective bolt 16. The head 17 of each bolt 16 is engaged in a respective recess 18 in that axial end surface of the member 7 which is opposite to the axial end surface with which the back-up member 13 is engaged. The diameter of each hole 15 is marginally less than that of the shank of the respective bolt 16 so that the shank has to be forced through the respective hole 15. Once forced through the hole 15, the bolt 16 cannot be readily detached therefrom so that bolts 16 tend to be held in position by virtue of the element 14. Furthermore, the element 14 is retained in position against the flange member 7 because of the engagement of the heads 17 of the bolts 16 with the flange member 7. Thus, the back-up member 13 is retained in position.

The coupling 1 further includes an anti-extrusion washer 19 which is engaged against an axial end surface of the arm 13b remote from the collet 10. The anti-extrusion washer 19 is secured to the back-up member 13 because it is provided an integral sleeve 20 which extends through the arm 13b and has an outwardly flared portion 21 which is snap engaged with a corresponding recessed portion in the axial end surface of the back-up member 13 adjacent the collet 10.

It will be appreciated from the above that the back-up member 13 holds the collet 10 and the anti-extrusion washer 19 in position and that the back-up member 13 itself is retained in position by means of the retainer element 14 which is engaged with the bolts 16.

The passage 6 in the body 5 is stepped to receive the pipe 3 and to receive the anti-extrusion washer 19 and portion 13b of the back-up member 13, and to receive an elastomeric O-ring seal 22.

In order to use the coupling 1, it is slipped over the end of the pipe 3 before the latter is inserted into the body 5. Following this, elastomeric O-ring seal 22 is passed over the pipe 3 and the pipe 3 is inserted into the body until it abuts against a step 23. Then, the O-ring 22 is engaged against a step 24 in the passage 6 and the coupling 1 is moved along the pipe 3 and orientated so that the bolts 16 are aligned with respective, internally screw-threaded bores 25 in the body 5. Tightening of the bolts 16 causes the flange member 7 to be drawn towards the body 5. During tightening, relative movement occurs between the flange member 7 and the split collet 10 which causes the latter to be inwardly compressed, as permitted by its axial split, so as to clamp firmly down onto the pipe 3. The portion 13a of the back-up member 13 is firmly clamped between the body 5 and the flange member 7 and the seal 21 is correctly positioned within the passage 6 and in engagement with the anti-extrusion washer 18.

In a modification, the anti-extrusion washer 19 is dispensed with so that the coupling consists merely of the flange member 7, the collet 10, the back-up member 13, the bolts 16, and the retaining element 14.

In a further modification, the anti-extrusion washer 19 is formed integrally with the back-up member 13 instead of being engaged therewith.

Referring now to FIG. 2 of the drawings, the in-line pipe joint illustrated partly therein includes two axially opposed pipe couplings 101 (only one shown) which are similar to the pipe couplings 1, and similar parts are accorded the same reference numerals but in the 100 series. However, in this embodiment, a common retainer element such as the retainer element 14 of FIG. 1 is replaced by separate retainers for bolts 116 and for seal back-up member 113. In this embodiment, arm 113a of member 113 has an annular peripheral groove 126 therein. A retainer ring 127 is disposed in a recess 128 in flange member 107. The retainer ring 127 has an integral inwardly directed inclined lip 129 which is engaged in the groove 126 to hold the back-up member 113 in position and which can be resiliently deformed. During assembly, the ring 127 is installed in the recess 128 before the back-up member 113 is installed, the back-up member 113 subsequently being forced into the flange member 107 until the lip 129 snaps into the groove 126 so that the back-up member 113 and collet 110 are retained against detachment from the flange member 107. Each bolt 116 is held in its respective hole 109 by means of a respective annular spring clip 130 which is fitted into a peripheral groove 131 in recess 118 in flange member 107 after insertion of the bolt 116 in the hole 109. Each spring clip 130 engages against the head 117 of the respective bolt 116 to prevent disengagement of the latter from the hole 109 but to permit rotation of the bolt 116 relative to the flange member 107.

In a modification (not shown), the spring clips 130 are replaced by individual washers which are an interference fit on the shanks of the bolts 116 on the opposite side of the flange member 107 to the recess 118. In a further modification (also not shown) the spring clips 130 are replaced by a single, common retainer ring similar to retainer element 14 with holes 15 but without the undercut chamfer at its inner periphery, whereby all the bolts 116 are retained by the single, common retainer ring.

The present invention is applicable not only to T-joints and in-line joints as shown, but also to elbow joints and to the coupling of a pipe to a member such as a valve body or other fitting.

We claim:

1. A pipe coupling comprising an annular flange member having a tapered inner surface portion and a plurality of holes therethrough, bolts projecting through said holes; means for retaining said bolts agsinst disengagement from said holes; a pipe-engageable collet mounted in said flange member and having a tapered outer surface portion engaged with said tapered inner surface portion; an annular seal back-up member positioned to retain said collet against disengagement from said flange member; and means for retaining said seal back-up member against detachment from said flange member; and wherein both of said retaining means are defined by an annular retainer element which overlaps an outer peripheral portion of said seal back-up member, the retainer element having a plurality of holes therethrough which are in substantial alignment with said holes through said flange member, and said bolts projecting through said holes in said retainer element, whereby said bolts and said retainer element are retained in position by virtue of their mutual interengagement and said seal back-up member and said collet are retained in position by virtue of the engagement of said retainer element with said seal back-up member.

2. The pipe coupling according to claim 1, wherein said bolts are an interference fit with said holes in said retainer element.

3. The pipe coupling according to claim 1 or 2, wherein said seal back-up member has an outer peripheral surface which is chamfered and said retainer element has an inner peripheral surface which is provided with an undercut chamfer whereby said retainer element overlaps said back-up member to retain it in position.

4. The pipe coupling according to claim 1, further including an anti-extrusion washer, said anti-extrusion washer and said seal back-up member being so mutually formed that said anti-extrusion washer is engaged with and held by said seal back-up member.

5. The pipe coupling according to claim 4, wherein said anti-extrusion washer has a formation which is a snap-fit with said seal back-up member.

6. A pipe coupling comprising an annular flange member having a tapered inner surface portion and a plurality of holes therethrough, bolts projecting through said holes; means for retaining said bolts against disengagement from said holes; a pipe-engageable collet mounted in said flange member and having a tapered outer surface portion engaged with said tapered inner surface portion; an annular, seal back-up member positioned to retain said collet against disengagement from said flange member; and means for retaining said seal back-up member against detachment from said flange member, including a retainer element engaged in a recess in said flange member, said retainer element having an inwardly direction portion engaged in a groove in said back-up member.

7. The pipe coupling according to claim 6, wherein said means for retaining said bolts comprises separate means for each bolt.

8. The pipe coupling according to claim 7, wherein each of said separate means comprises a spring clip engaged in a respective recess in the flange member and co-operating with a head of a respective one of the bolts.

9. A pipe coupling comprising an annular flange member having a tapered inner surface portion and a plurality of holes therethrough, bolts projecting through said holes; means for retaining said bolts against disengagement from said holes; a pipe-engageable collet mounted in said flange member and having a tapered outer surface portion engaged with said tapered inner surface portion; an annular, seal back-up member positioned to retain said collet against disengagement from said flange member; means for retaining said seal back-up member against detachment from said flange member; and an anti-extrusion washer, said anti-extrusion washer and said seal back-up member being so mutually formed that said anti-extrusion washer is engaged with and held by said seal back-up member.

10. The pipe coupling according to claim 9, wherein said anti-extrusion washer has a formation which is a snap-fit with said seal back-up member.

* * * * *